UNITED STATES PATENT OFFICE.

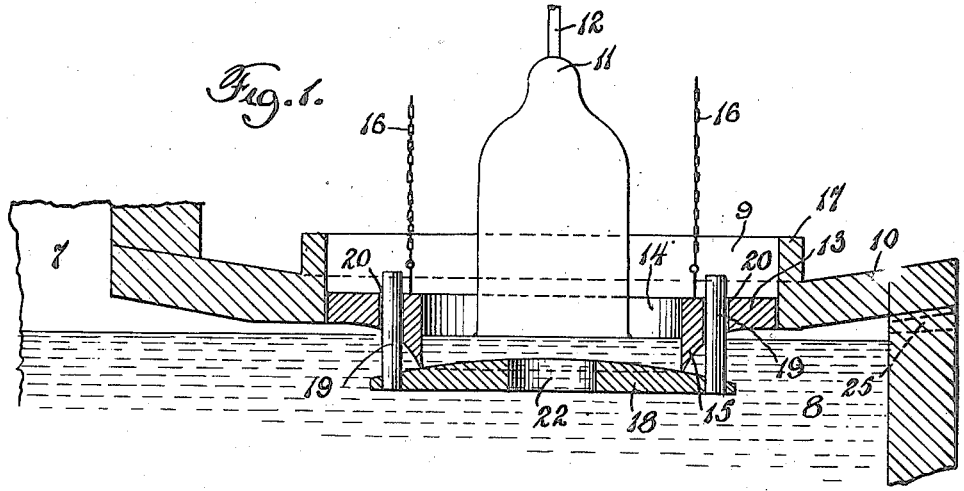
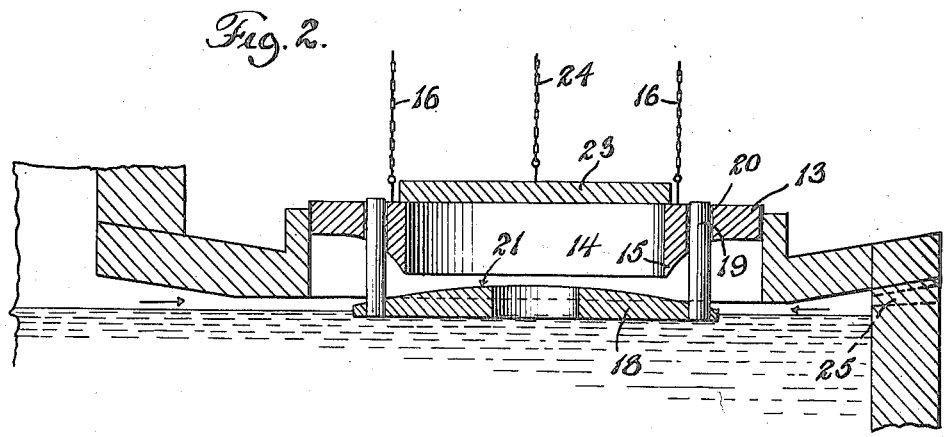
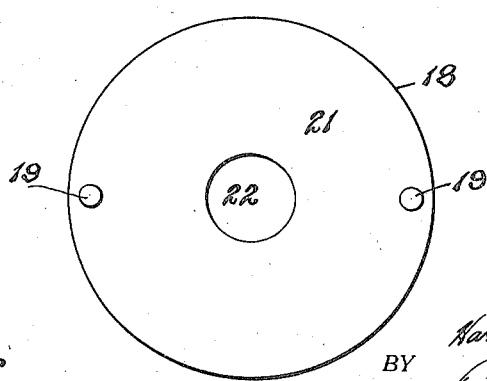

HARRY G. SLINGLUFF, OF MOUNT VERNON, OHIO, ASSIGNOR TO PITTSBURGH PLATE GLASS COMPANY, OF PITTSBURGH, PENNSYLVANIA, A CORPORATION OF PENNSYLVANIA.

APPARATUS FOR DRAWING GLASS CYLINDERS.

1,188,107.   Specification of Letters Patent.   Patented June 20, 1916.

Application filed April 6, 1912. Serial No. 689,071.

*To all whom it may concern:*

Be it known that I, HARRY G. SLINGLUFF, a citizen of the United States, residing at Mount Vernon, in the county of Knox and State of Ohio, have invented certain new and useful Improvements in Apparatus for Drawing Glass Cylinders, of which the following is a specification.

This invention has reference to apparatus for drawing glass cylinders and it has for its primary objects; the provision of improved apparatus for drawing cylinders from a body of glass whereby only the purest portions of the glass are utilized, thus securing a product of high grade and reducing breakage through imperfections to a minimum thereby lessening the cost of production; and the provision of improved apparatus of the character described whereby a portion of the glass is segregated, a cylinder drawn therefrom and the cooled portions of glass remaining remelted and carried away from the point of drawing. My invention further contemplates the provision of an improved form of drawing ring. These, together with such other objects as may hereinafter appear or are incidental to my invention, I attain by means of a construction illustrated in preferred form in the accompanying drawings, wherein Figure 1 is a section through a glass tank showing my improved apparatus in position for the drawing operation, Figure 2 is a view similar to that of Figure 1, the parts being shown in position after the completion and cutting off of a cylinder, and Figure 3 is a plan view of my improved form of drawing ring.

Referring to the drawings, it will be seen that I have illustrated, in diagrammatic form, a glass furnace or tank 7 provided with an extension or dog house 8 having an orifice 9 formed in the roof or upper wall 10 through which the drawing of the cylinders is accomplished. The cylinders are drawn by means of a bait 11 which is attached to a blow pipe 12 (connected to some air supply) which is lowered or raised by any preferred form of operating mechanism in the usual manner.

Mounted within the orifice 9 is a top-stone 13 which is provided with a central opening or orifice 14 around which extends an annular flange or ring 15 which projects downward and is preferably tapered as indicated in the drawings. The top-stone is supported by chains or cables 16 and is raised and lowered in the usual manner by any preferred form of operating mechanism. The roof 10 of the dog house may be provided with an upstanding flange portion 17 which extends around the orifice 9 and serves to steady and guide the top-stone as it is being lowered and raised.

The drawing ring 18 is formed of suitable refractory material and floats or is supported in the glass in the dog house and is guided or maintained in position beneath the opening or orifice 14 in the top-stone by means of the posts 19 which project through and have sliding engagement with the apertures 20 formed in the top-stone. The drawing ring is a substantially flat plate but its upper surface slopes slightly downward from the center to the edges, the slope being preferably provided by giving a convex contour to the said surface. An orifice 22 is formed in the central portion of the drawing ring for a purpose which will hereinafter appear. The opening 14 in the top-stone is closed by means of a cap-stone 23 which is suspended from suitable operating mechanism by means of chains 24 and is swung back and forth into and out of position over the opening 14 in the usual manner.

The operation of the apparatus is as follows, assuming that the cap-stone 23 has been swung out of the way. The top-stone 13 is lowered and the flange or ring 15 thereof contacts with the upper surface 21 of the drawing ring, the downward movement of the top-stone being continued until the drawing ring is submerged below the level of the glass, as indicated in Figure 1. The drawing ring and top stone when in this position constitute in effect a containing vessel, the line of contact between the two being sealed by the glass in the tank, thus preventing access to the interior of molten glass from the sides of the drawing ring and segregating the glass which enters or wells up through the orifice 22 as the drawing ring is being submerged. It is well known that the impurities contained in the glass rise to the surface and it will be seen that by this operation the surface glass has no access to the interior of the top-stone and ring and that only the purer glass from below the surface of the glass is segregated. The bait 11 is then lowered into the segregated glass and the drawing operation proceeded with in the usual manner. After a cylinder has been drawn, the top-stone is lifted to substantially the position shown in Figure 2 at which time the drawing ring has assumed its normal floating level and heat from the tank and the twyers 25 can freely pass over and around the drawing ring and cut off the cylinder. The portion of glass remaining after the completion of the cylinder, viz. the remainder of the segregated glass, together with such portions as may break off from the cylinder is much cooler than the molten glass and is no longer in condition suitable for drawing. This glass remains on the drawing ring and is carried away in the following manner. After the cylinder is cut off, the cap-stone is swung over the opening 14 and the heat is confined in the dog house and reflected against the top of the drawing ring and melts the glass which then flows down the sloping surface of the drawing ring and is discharged at the edges thereof and at a point away from the orifice 22.

From the foregoing it will be evident that only the purer glass is utilized and that there is thus secured a product of a high quality in which breakage from imperfections is reduced to a minimum. The apparatus is simple and the drawing operation can be repeated at short intervals effecting a great saving in time.

In the drawings I have illustrated the apparatus applied to a glass tank or furnace having an extension from which the drawing is accomplished, but it will be apparent that the apparatus may be utilized in other arrangements of tanks or drawing receptacles. It will also be understood that the term drawing ring used in this specification is not limited to a drawing member of circular form but is intended to be used in its broad sense.

Having thus described my invention and illustrated its use, what I claim as new and desire to secure by Letters Patent is the following:

1. In apparatus for drawing glass cylinders, the combination of a glass tank provided with a drawing opening, a substantially flat drawing ring located in the tank below the said opening and provided with an orifice through its central portion of a diameter less than that of the cylinder to be drawn, and means for securing a vertical movement of the ring, the upper surface of the said ring being convex.

2. In apparatus for drawing glass cylinders, the combination of a glass tank provided with a drawing opening, and a drawing plate located in the tank below the drawing opening and having its upper surface inclined upward from the edges toward the center, the said plate being supported in the glass for vertical movement whereby the upper surface may be depressed below the surface of the glass or raised above it.

3. Apparatus for drawing glass cylinders comprising in combination, a substantially flat drawing ring normally floating in the molten glass with its upper face above the surface of the glass, a top-stone adapted to contact with the drawing ring and cause the submergence thereof and prevent access of the molten glass from the edge portion to the central portion thereof, an orifice substantially in the central portion of the drawing ring of a diameter less than that of the cylinder to be drawn, and means for raising and lowering the top-stone.

4. Apparatus for drawing glass cylinders comprising in combination a substantially flat drawing ring normally floating in the molten glass, a top-stone adapted to contact with the drawing ring and submerge it and prevent access of the molten glass from the edge portion to the central portion thereof, an orifice substantially in the central portion of the drawing ring and of a diameter less than that of the cylinder to be drawn, means for raising and lowering the stone, and guide means for the drawing ring.

5. Apparatus for drawing glass cylinders comprising in combination a substantially flat drawing ring normally floating in the molten glass with its upper face above the surface of the glass, a top-stone adapted to contact with the drawing ring and cause the submergence thereof and prevent the access of the molten glass from the edge portion to the central portion thereof, an orifice substantially in the central portion of the drawing ring of a diameter less than that of the cylinder to be drawn, and means for raising and lowering the top-stone, the top surface of the ring being inclined downward from the orifice to the edges.

6. Apparatus for drawing glass cylinders comprising in combination a floating drawing ring having its upper surface sloping downward from the center toward the edges, a top-stone adapted to contact with the drawing ring circumferentially adjacent the edge portions thereof and cause the submergence of the ring, an orifice substantially in the central portion of the drawing ring and of a diameter less than that of the cylinder to be drawn, and means for raising and lowering the top-stone.

7. In apparatus for drawing glass cylinders from a body of glass in a tank, a drawing ring movable vertically in the glass and provided with a central orifice through which the glass forming the cylinder passes when the ring is submerged, and having a top surface inclined downward from the orifice toward the edges for draining the glass upon the surface away from the orifice into the body of glass when the top surface is raised above the surface of the glass.

In testimony whereof I have hereunto signed my name in the presence of the two subscribed witnesses.

HARRY G. SLINGLUFF.

Witnesses:
BANNER M. ALLEN,
L. L. WILLIAMS.